(12) United States Patent
Eriksson

(10) Patent No.: US 6,394,038 B1
(45) Date of Patent: May 28, 2002

(54) TEAT CLEANING BRUSH

(75) Inventor: Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/555,896

(22) PCT Filed: Dec. 2, 1998

(86) PCT No.: PCT/SE98/02206

§ 371 (c)(1),
(2), (4) Date: Jun. 5, 2000

(87) PCT Pub. No.: WO99/27774

PCT Pub. Date: Jun. 10, 1999

(30) Foreign Application Priority Data

Dec. 4, 1997 (SE) .............................................. 9704518

(51) Int. Cl.$^7$ ................................................ A01K 13/00
(52) U.S. Cl. ........................ 119/609; 119/615; 119/600; 15/21.1
(58) Field of Search ................................ 119/609, 615, 119/14.01–14.55; 15/21.1, 23, 28, 29

(56) References Cited

U.S. PATENT DOCUMENTS

| 2,952,860 A | | 9/1960 | George | |
|---|---|---|---|---|
| 5,383,423 A | * | 1/1995 | van der Lely | 119/14.08 |
| 5,934,220 A | * | 8/1999 | Hall et al. | 119/14.08 |

FOREIGN PATENT DOCUMENTS

| DE | 1 27 384 | 9/1977 |
|---|---|---|
| EP | 0 207 572 | 1/1987 |
| GB | 2363 | 5/1981 |
| SU | 1739917 | 6/1992 |

* cited by examiner

Primary Examiner—Charles T. Jordan
Assistant Examiner—Judith Nelson
(74) Attorney, Agent, or Firm—Young & Thompson

(57) ABSTRACT

A teat cleaning device for animals includes a plurality of circumferentially separated elongated brushes individually rotatable about a vertical longitudinal axis, each of the brushes having bristles extending outwardly from a vertical shaft, the brushes together defining a central teat receiving space where the bristles of a lower portion of each brush are inclined upwardly from the vertical shaft.

12 Claims, 5 Drawing Sheets

TEAT CLEANING BRUSH

BACKGROUND OF THE INVENTION

The present invention relates to teat cleaning devices for cleaning the teats of animals.

DESCRIPTION OF THE RELATED ART

A problem when milking dairy animals is how to ensue that the teats of the animal are clean before milking commences. As manual teat cleaning is labour-intensive, inefficient and time consuming various machines for cleaning teats have been proposed.

The German patent DD 127 384 describes a device with a plurality of elongated brushes mounted vertically on a holder. The brushes can rotate about their vertical central axis and have horizontally projecting bristles which can brush the surface of any teats introduced vertically down between the brushes. As the teat advances downwards the bristles are bent down and away from the tip of the teat. This device thus suffers from the disadvantage that the bristles do not adequately clean the tip of the teat.

SUMMARY OF THE INVENTION

An object of the present invention is to overcome the problems of the prior art teat cleaning devices. These problems are overcome by a teat cleaning device having the features mentioned in the characterising portion of claim 1. Further developments and improvements to the invention are mentioned in the dependent claims.

In the present invention a teat cleaning device has substantially vertically mounted rotatable cleaning means such as brushes which are provided with cleaning elements such as bristles, the ends of which form a brushing surface which at least partly is inclined upwards. Thus a brushing surface can be formed by, for example, the distal ends of bristles, or the distal circumferential surfaces of cleaning disks, which are inclined upwards. In this application all orientations refer to orientations taken up when the device is in use for cleaning a teat and a vertical axis or direction is defined as being parallel to the longitudinal axis of a teat being cleaned. A vertical position which is nearer to an udder to which the teat is attached is defined to be higher than a vertical position which is nearer to the tip of the teat.

Normally cylindrical brushes comprise bristles collected into conical tufts mounted with the narrower proxial end in a cylindrical support. The bristles comprised in the tuft and situated above its longitudinal axis i.e. a radial axis with respect to the cylindrical shaft, are inclined upwards a few degrees (usually less than 5 degrees) even if the longitudinal axis is horizontal. These few degrees are not sufficient to produce the advantageous effects of the present invention. In order to more precisely differentiate the present invention from the prior art it is therefore appropriate to define what is meant by inclined upwards. Thus the expression upwardly inclined is intended to mean that the longitudinal axis of the tuft of bristles is upwardly inclined. In the case of disks then it is the cylindrical circumferential surface which is upwardly inclined. In the case of cleaning devices which have bent cleaning means e.g. flat inner discs with upturned outer discs then it is the plane of symmetry between the upper and lower surfaces of the outer discs which is inclined to the vertical.

A teat is introduced into the device vertically from above. As the teat is introduced into the device the upwardly inclined bristles resp. disc surfaces are bent downwards owing to the weight of the teat and the tips of the bristles resp. disc surfaces move outwards away from the axis of rotation of the brush and consequently nearer to the centre of the teat. Thus during loading with a teat i.e. when in contact with the tip of a teat being introduced past them, the tips of the bristles resp. the disk surfaces project out a greater distance from the axis of rotation then when there is no teat present. Thus the tip of the teat itself as it is being introduced pushes the tips of the bristles resp. disc surfaces into a position where they can clean the tip of the teat. As the teat is introduced further the bristles resp. disc surfaces are bent more by the thicker body of the teat and the tips of the bristles resp. disc surfaces ultimately can be pushed into horizontal or downwardly bent orientations.

BRIEF DESCRIPTION OF THE DRAWINGS

Example of embodiments of the invention are shown in the appended drawings in which.

DESCRIPTION OF THE PREFERRED EMBODIMENTS

Figure 1A:
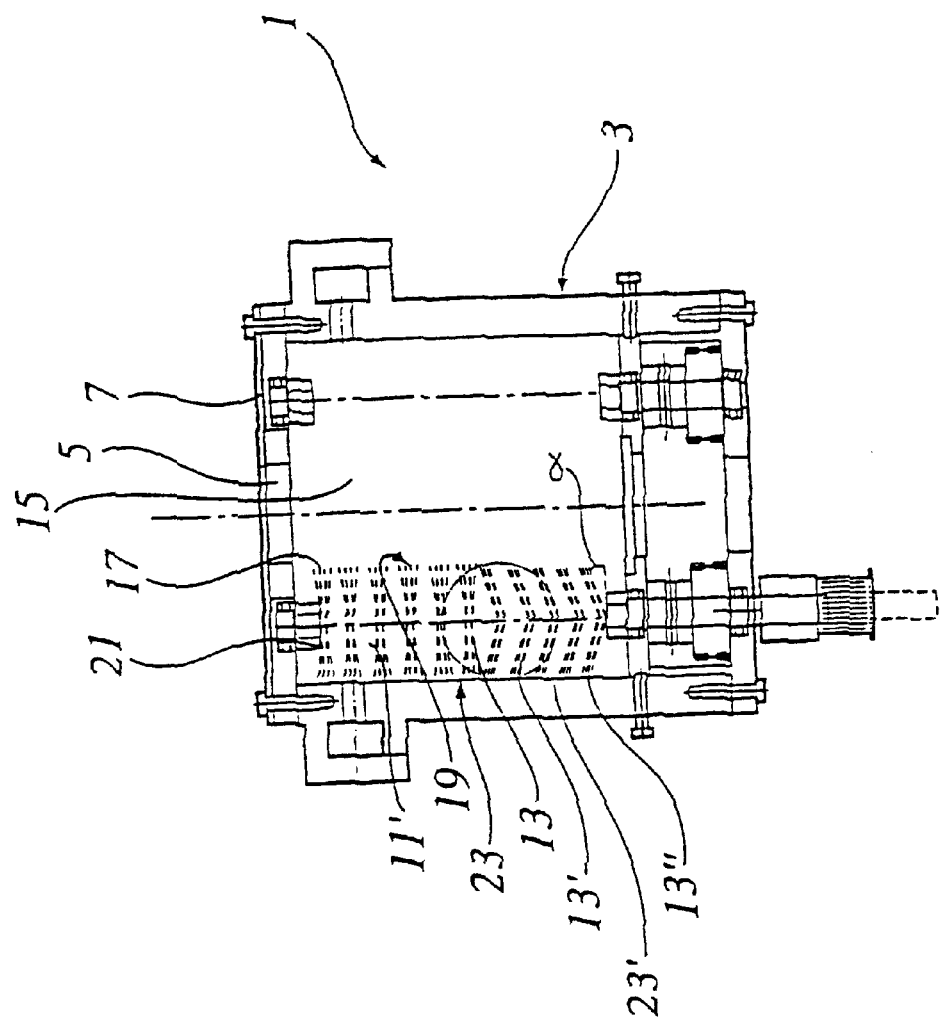
FIG. 1a) shows a lateral view of one embodiment of a teat cleaning device according to the present invention.
Figure 1B:
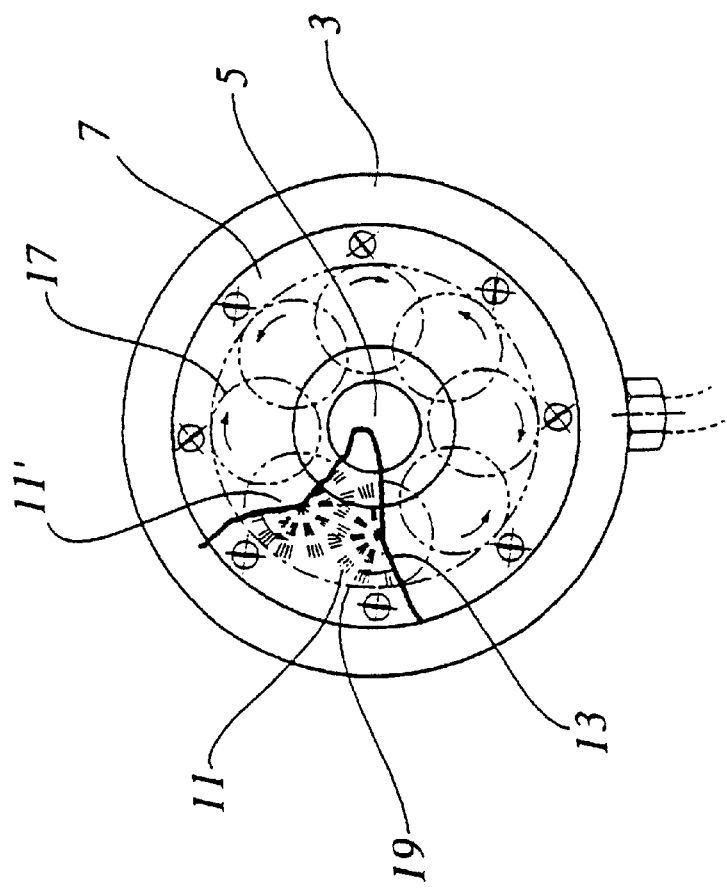
FIG. 1b) shows a plane view from above of the device shown in FIG. 1a)

FIGS. 1a) and 1b) show a first embodiment of a teat cleaning device 1 according to the invention. Teat cleaning device 1 comprises a box-like holder 3 with a teat receiving opening 5 in its upper surface 7. Holder 3 is intended to be placed under the udder of an animal to be milked with opening 5 below a teat which is to be cleaned Holder 3 is then raised so that the teat enters the holder through opening 3. Holder 3 contains a plurality of cleaning means 11 shown here as elongated cylindrical brushes 11 with bristles 13, 13'. Holder 3 also contains cleaning fluid supplying means (not shown) and preferably drying air supplying means (not shown). Brushes 11 are each orientated with their longitudinal axis substantially perpendicular to the plane of upper surface 7 and are arranged in a circle with a central space 15 able to receive a teat. Brushes 11 are rotatably mounted on holder 3 and can be rotated by driving means (not shown) of any suitable type. There are preferably an even number of brushes 11 and each brush 11 rotates in the opposite direction to its neighbouring brushes 11 as is shown by the arrows in FIG. 1b). Brushes 11 have cleaning surfaces 17 formed by the tips 19 of bristles 13, 13' projecting from a central longitudinal shaft 21. At least one of the brushes 11 is divided longitudinally into two portions 23, 23'. Portion 23 has bristles 13 which extend perpendicular to the longitudinal axis of central shaft 21 while portion 23' has bristles 13' which, in the rest position, extend upwards at an angle I to the longitudinal axis of central shaft 21. Angle I depends on the stiffness of the bristles 13' which is a function of their length, material and thickness, and can be between 5° and 75°. An example of suitable dimensions when the bristle material is Nylon (TM) are: bristle diameter 0.1 mm, length 9 mm, I=15°. The bristles 13' are shown extending upwards with different angles I with, for example the upper bristles 13" at the end of portion 23' which is intended to be uppermost during use having an angle I of 15° while lower bristles 13''' at the lower end of portion 23' extend upwards at an angle I of 60°. The greater the angle I the greater the resistance to downwards deflection the bristles have and consequently the greater the scrubbing force they exert on the teat.

A tear which is to be cleaned is introduced into the device 1 vertically from above and holder 3 is raised. Brushes 11, 11' are rotated and as the teat is introduced into the device it is first brushed by the brushing surface formed by the tips of bristles 13 which are subsequently bent down below a horizontal plane by the weight of the teat. As the teat is introduced further into the device it meets the upwardly inclined bristles 13', 13" which are bent downwards owing to the weight of the teat. Thus the tips of the bristles 13, 13" first move outwards away from the axis of rotation of the brush as they are pushed down towards a horizontal orientation and they therefore rub more tightly on teat. Thus during and after loading with a teat, i.e. when in contact with the tip of a teat being introduced past them, the tips of the bristles project out a greater distance from the axis of rotation then when there is no teat present. Thus the tip of the teat itself as it is being introduced pushes the tips of the bristles into a position where they can clean the tip of the teat. As the teat is introduced further the bristles are bent more by the thicker body of the teat and the tips of the bristles ultimately can be pushed into horizontal orientations. Further bending of the bristles moves their ends to laterally or downwardly bent orientations. The length of at least some of the bristles 13', 13" are chosen such that when they are forced to project horizontally they preferably extend to, or beyond, the centre of the teat receiving opening to ensure that the centre of the tip of the teat is also scrubbed. Preferably the rings of bristles on the brushes are staggered so that interference between the bristles on different brushes 11, 11' is minimised during use.

Figure 2A:
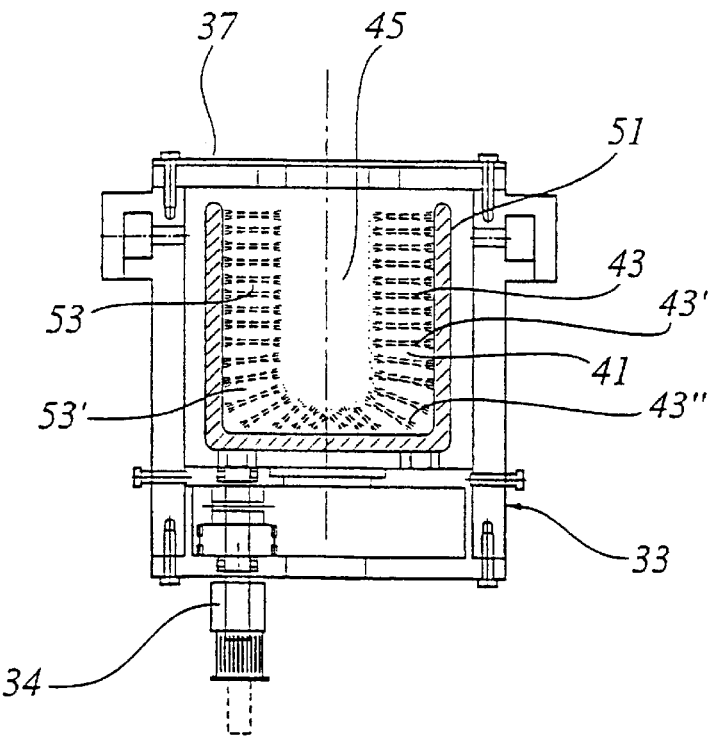
FIG. 2a) shows a lateral view of a second embodiment of a teat cleaning device according to the present invention.
Figure 2B:
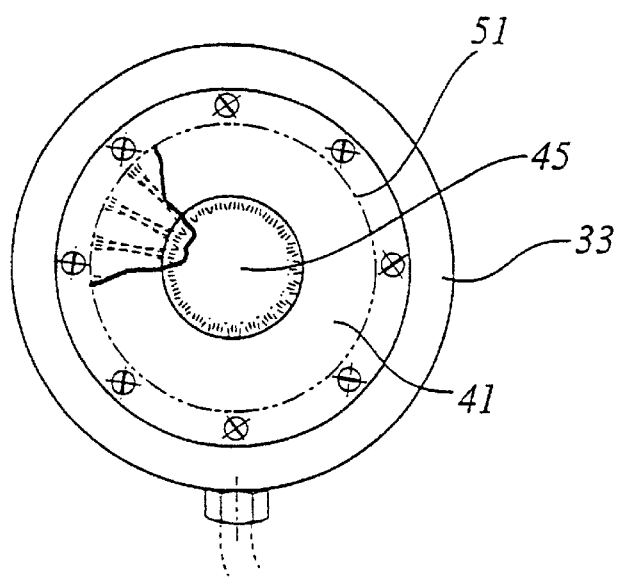
FIG. 2b) shows a plane view from above of the device shown in FIG. 2a).

A second embodiment of the invention is shown in FIGS. 2a) and 2b). Holder 33 contains a cleaning means 39 shown here as an elongated tubular brush 41 with internal bristles 43, 43'. Bristles 43, 43' project in towards the centre of brush 41 from a casing 51 and form a central space 45 able to receive a teat. As before holder 33 also contains cleaning fluid supplying means (not shown) and preferably drying air supplying means (not shown). Brush 41 has a longitudinal axis substantially perpendicular to the plane of upper surface 37 and is rotatably mounted on holder 33 and can be rotated by driving means 34 of any suitable type. Brush 41 has a cleaning surface 47 formed by the tips 39 of bristles 43, 43' projecting from the casing 51. Brush 31 is divided longitudinally into two portions 53, 53'. Portion 53 has bristles 43 which extend perpendicular to the longitudinal axis of brush 41 while portion 53' has bristles 43' which, in the rest position, extend upwards at an angle I to the longitudinal axis of brush 31. Angle I depends on the stiffness of the bristles 43' and can be between 5° and 75°. Preferably angle I is between 15° and 45°. The bristles 43' are shown extending upwards with different angles I with, for example the upper bristles 43' at the end of portion 53' which is intended to be uppermost during use having an angle I of 15° while lower bristles 43''' at the lower end of portion 53' extend upwards at an angle I of 60°. The greater the angle I the greater the resistance to downwards deflection the bristles have (assuming the length of the bristles remain the same) and consequently the greater the scrubbing force they exert on the teat. While the embodiment shown has a cup-like casing 51 with unitary base and side it is conceivable that the base is separated from the wall and provide with independent drive means, The base can in this case also be provided with substantially vertically projecting bristles and can optionally made vertically adjustable with respect to the housing. Furthermore the cup-like casing 51 can be exchanged for some other suitable bristle supporting means, for example, one or more vertically projecting arms.

Figure 3:
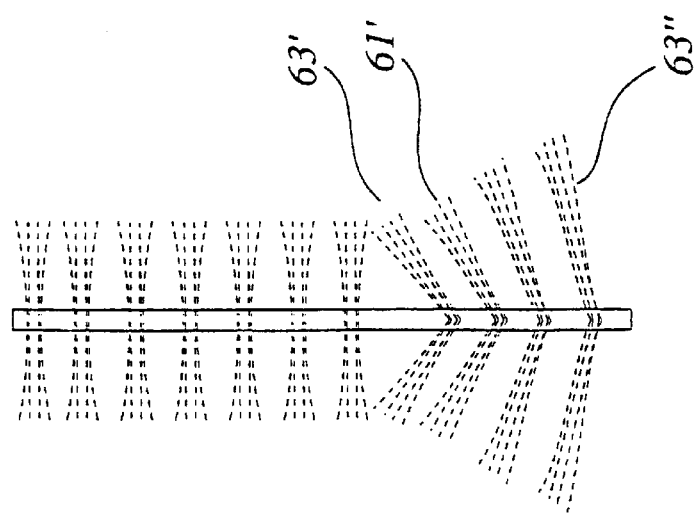
FIG. 3 shows schematically an embodiment of a brush for use in the device shown in FIGS. 1a) and 1b).

In an alternative embodiment of the invention shown in FIG. 3 the bristles 61' at the end of portion 63' which is intended to be uppermost during use having an angle of 60° while bristles 61" at the lower end of portion 63' extend upwards at an angle of 15°.

Figure 4:
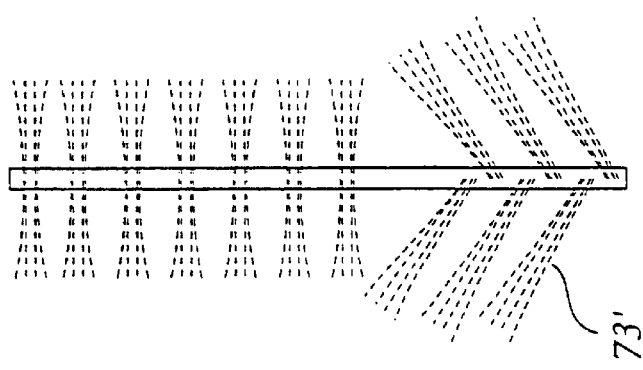
FIG. 4 shows schematically another embodiment of a brush for use in the device shown in FIGS. 1a) and 1b).

In a further embodiment of the invention shown in FIG. 4 in the idle position all the vertically inclined bristles 73' project upwards with the same angle I.

Figure 5:
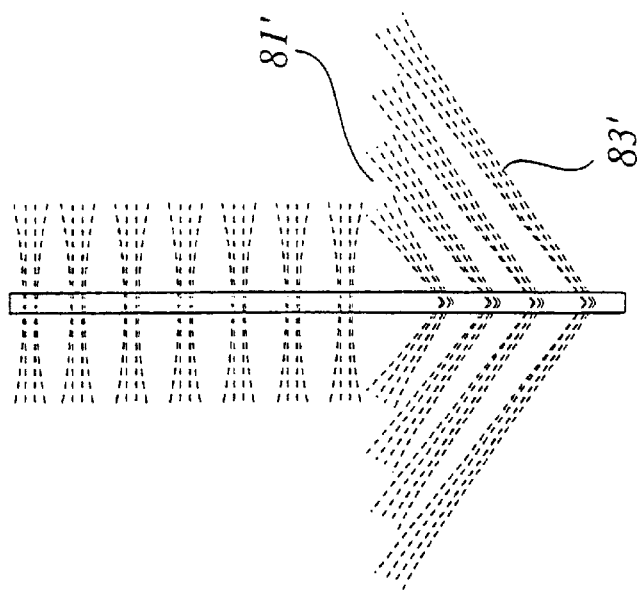
FIG. 5 shows schematically a further embodiment of a brush for use in the device shown in FIGS. 1a) and 1b).

In another embodiment of the invention shown in FIG. 5 in the idle position all the vertically inclined bristles 83' project upwards with the same angle I and the length of the bristles increases from the top of portion 81' downwards so that the tips of the lower bristles project out further from the central shaft.

Figure 6:
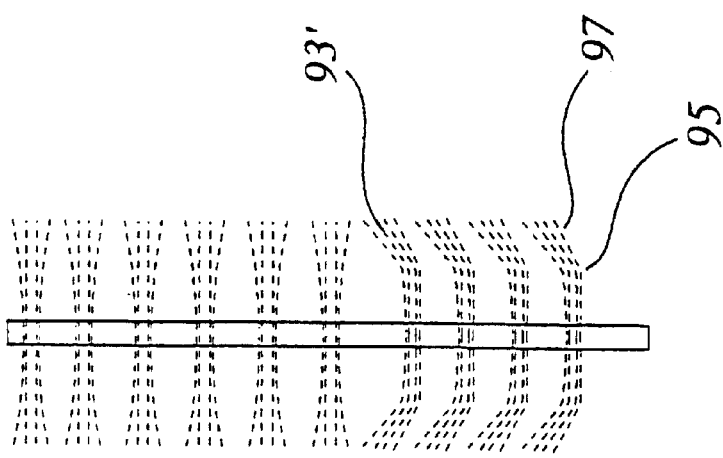
FIG. 6 shows schematically yet another embodiment of a brush for use in the device shown in FIGS. 1a) and 1b).

FIG. 6 shows a further embodiment of the invention in which the vertically inclined bristles 93' are bent and comprise flat inner portions 95 and upwardly inclined distal ends 97.

While it has been stated that the cleaning surface is formed by the tip of bristles it is of course possible that during use the tips of the bristles are bent away from the teat to be cleaned in which case the cleaning surface can also comprise the outer portions of bristles.

Figure 7:
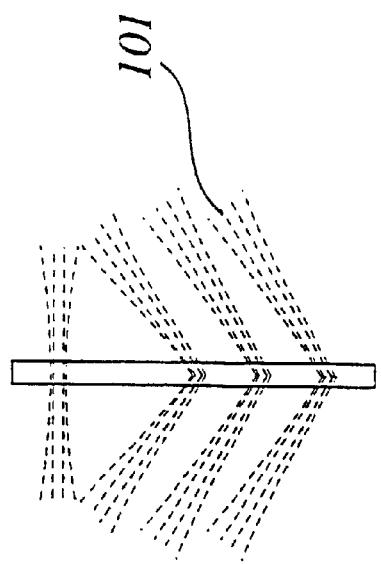
FIG. 7 shows schematically yet another embodiment of a brush for use in the device shown in FIGS. 1a) and 1b).

It is also conceivable to replace brushes with bristles by any other suitable resilient inclined cleaning means for example inclined disks of sponge material 101 as shown in FIG. 7, inclined rubber disks, flat disks with inclined projections, brushes with projecting loops of bristle material e.g. threads, etc.

While the invention has been illustrated by a device comprising a cylindrical holder with a base and side it is possible to eliminate the sides of the holder.

It is also conceivable to apply the principles of the embodiments shown with cylindrical brushes to the embodiments described with tubular brushes and vice versa.

What is claimed is:

1. Teat cleaning device for animals, comprising a plurality of circumferentially separated elongated brushes (11, 11') individually rotatable about a vertical longitudinal axis thereof each of the brushes (11, 11') having bristles extending outwardly from a vertical shaft (21) thereof, such that the brushes (11, 11') together define a central teat receiving space (15), characterised in that the bristles of a lower portion of each brush (11, 11') are inclined upwardly from the vertical shaft (21).

2. Teat cleaning device according to claim 1, characterised in that the inclination of the bristles of each of the brushes, increases from an uppermost part of said lower portion towards a lowermost part of said lower portion.

3. Teat cleaning device according to claim 1, characterised in that said lower portion of the bristles of each of the brushes, have the same inclination.

4. Teat cleaning device according to claim 3, characterised in that the length of the bristles of each of the brushes, increases from the uppermost part of said lower portion towards the lowermost part of said lower portion.

5. Teat cleaning device according to claim 1, characterised in that the inclination of the bristles of each of the brushes, decreases from the uppermost part of said lower portion towards the lowermost part of said lower portion.

6. Teat cleaning device according to claim 1, characterised in that the lower portion of the bristles of each of the brushes, are bent and comprise flat inner portions and upwardly inclined distal ends.

7. Teat cleaning device according to claim 1, characterised in that the length of said bristles of each of the brushes, extend to, or beyond the centre axis of said central teat receiving space (15).

8. Teat cleaning device according to claim 1, characterised in that bristles of an upper portion of each brush (11, 11') extend perpendicularly from the vertical shaft (21).

9. Teat cleaning device according to claim 1, characterised in that the bristles of each brush are arranged in rings and the rings of bristles on adjacent brushes (11, 11') are mutually staggered.

10. Teat cleaning device according to claim 1, characterised in that said inclination of the lower portion of the bristles of each brush is between 5° and 75°.

11. Teat cleaning device according to claim 10, characterised in that said inclination of the bristles of the lower portion is between 15° and 45°.

12. Teat cleaning device according to claim 1, characterised in that said bristles (11, 11') of each of the brushes, are flexible.

* * * * *